Jan. 29, 1957

S. D. DALTON 2,779,717

METHOD OF DISTILLING A HIGH BOILING HYDROCARBON
OIL FOR USE AS A FEED IN CATALYTIC CRACKING

Filed Dec. 15, 1950

INVENTOR.
Swanton D. Dalton
BY
Hastings S. Trigg
AGENT OR ATTORNEY

United States Patent Office 2,779,717
Patented Jan. 29, 1957

2,779,717

METHOD OF DISTILLING A HIGH BOILING HYDROCARBON OIL FOR USE AS A FEED IN CATALYTIC CRACKING

Swanton D. Dalton, Summit, N. J., assignor to Socony Mobil Oil Company, Inc., a corporation of New York Application December 15, 1950, Serial No. 201,023

3 Claims. (Cl. 196—52)

This invention relates to the conversion of high-boiling liquid hydrocarbons or mixed phase hydrocarbons to lower-boiling hydrocarbons in the presence of a moving, particle-form contact mass material which may or may not catalytically influence the conversion. It is more particularly concerned with a method of treating high-boiling hydrocarbon charge stocks, such as crude petroleum, and of charging the treated charge stocks to a conversion zone.

The present method can be applied to any process for the conversion of liquid hydrocarbons. Non-limiting examples of such processes are catalytic cracking, thermal cracking, reforming, hydrogenation, dehydrogenation, aromatization, alkylation, and processes involving a combination of two or more such operations. Thus, cracking of hydrocarbons can be effected thermally or catalytically. Thermal, non-catalytic operations are usually carried out in the presence of non-catalytic heat carriers, such as spheres or particles of metals, stones, or refractory materials, e. g., mullite, zirkite, or corhart material. Catalytic cracking, on the other hand, is effected at temperatures in the order of about 800° F. and higher, in the presence of suitable absorbent type catalysts. Such catalysts can be natural or treated clays; bauxite; inert carriers on which catalytic materials, such as metal oxides, have been deposited; or certain synthetic associations of silica and/or alumina, to which small amounts of other materials, such as metal oxides, can be added for special purposes. When the operation involves catalytic reforming, aromatization, hydrogenation, etc., catalysts typical of such processes are used. Such catalysts are well known to those familiar with the art, and reference should be made to the voluminous literature on such subjects for specific details of these catalysts and of the processes in which they are utilizable.

Accordingly, in the specification and claims, the terms "contact mass material," "contact mass," and "contact material" refer to contact materials broadly, whether they are catalytic or non-catalytic in their operation, unless specifically stated otherwise. Likewise, "conversion" refers to catalytic or non-catalytic operations in which the aforementioned contact mass materials are utilized to change the physical and chemical characteristics of hydrocarbon charge stocks. The term, "gaseous phase," and similar terms, refer to material which is in the gaseous state under the particular conditions of the operation involved, regardless of the normal phase under ordinary conditions of temperature and pressure. Finely-divided contact material as contemplated herein, will have a particle size of between about 0.022 inch and about 1.0 inch average diameter, ordinarily.

As is well known to those familiar with the art, many hydrocarbon fractions, particularly crude petroleum stocks, contain heavy residual materials to a greater or lesser extent, such heavy residual materials including tars, asphalts, salts, and the like. If charge stocks containing such residual materials are charged directly to a conversion zone in contact with a contact mass material, disadvantageous results are obtained. Most notably, excessive amounts of coke tend to form on the contact mass, thereby reducing the efficiency of the contact mass material as a catalyst or as a heat exchange medium, and, also, necessitating frequent removal of the coke deposits from the contact mass material. The formation of coke is not confined to the contact mass material alone. Coking also occurs in the reactor and in the lines feeding charge materials and withdrawing products from the reactor. Such coking results in frequent shutdowns for cleaning and repair, and in reduced overall efficiency of the conversion process.

In the prior art processes, coking difficulties have been avoided by several methods. For example, when it has been desired to charge a reactor in the gaseous phase, a crude stock was preheated and charged into a tar separator operated at temperatures in the neighborhood of 700–850° F., in the presence of added steam under a pressure of about 20 pounds per square inch gauge. As a result of this operation a fraction having an initial boiling point of 400–500° F. and an end point of 700–950° F. was obtained. This fraction, in the gas phase, was charged directly to the reactor. The remaining charge stock, comprising higher-boiling hydrocarbons, tars, asphalts and the like, was not available to the conversion operation. Unfortunately, this tar separator bottoms cut carried with it a substantial amount of unfractionated straight-run hydrocarbon material boiling within the desirable cracking stock range. This material was lost as a cracking stock and undesirably increased the yield of heavy fuel oils from the overall refinery operations, due to its relatively poor value as a viscosity cutting stock in the tar separator cut.

In the "liquid phase" operation, more of the crude charge stock was utilized. In typical operations, crude petroleum was charged into a topping still wherein a straight-run gasoline fraction was removed as the distillate. The residual fraction was subjected to a high capacity and expensive deasphalting or vacuum reduction operation. Then the deasphalted, topped crude was preheated and passed into a tar separator operated at 700–900° F. The vapors therefrom were charged to a conversion zone as a gaseous charge, and the residual was charged as a liquid charge stock. As will be apparent to those skilled in the art, such a method of operation is disadvantageous in several respects. The use of solvents for deasphalting the entire crude or crude residuum fraction is costly both from the standpoint of equipment and of solvent make-up. Moreover, it undesirably complicates the refinery and requires introduction of extraneous chemicals into the stock preparation system. When vacuum distillation was employed, the heat efficiency of the overall operation was very poor. The deasphalted overhead from the vacuum tower, which generally represented the great bulk of the original crude or reduced charge to the still, had to be condensed in order to permit pumping to the pressure level of the tar separator, and then revaporized prior to its introduction into the tar separator. What is more important, this method involves a separate deasphalting operation, which involves additional capital equipment costs and added high operating costs.

Accordingly, it is a broad object of the present invention to provide an improved method for converting crude high-boiling hydrocarbon charge stocks, which is simple and relatively inexpensive. Another object is to provide a method of conversion which utilizes a greater amount of a crude petroleum charge stock. A specific object is to provide a method of converting crude charge stocks without resort to expensive deasphalting operations. Other objects and advantages of the present invention will become apparent to those skilled in the art, from the following detailed description considered in conjunction with the drawings attached hereto.

In a broad aspect thereof, the present invention comprises heating a high-boiling liquid hydrocarbon charge stock to a suitable temperature, separating that portion of the charge stock which is in the gaseous phase at the selected temperature from the portion which is in the liquid phase at the temperature selected, passing said gaseous phase portion into a reactor as the gaseous feed, subjecting said liquid phase portion to vacuum distillation under desired conditions of temperature and pressure, condensing the vacuum distillate and passing it into the reactor as the liquid feed, and removing tars, asphalts, salts and the like as the heavy residual from the vacuum distillation operation.

In the drawings:

Fig. 4 is a diagrammatic representation of the present method in still another embodiment of a process of conversion in the presence of a fluidized mass of contact material.

Figure 1:
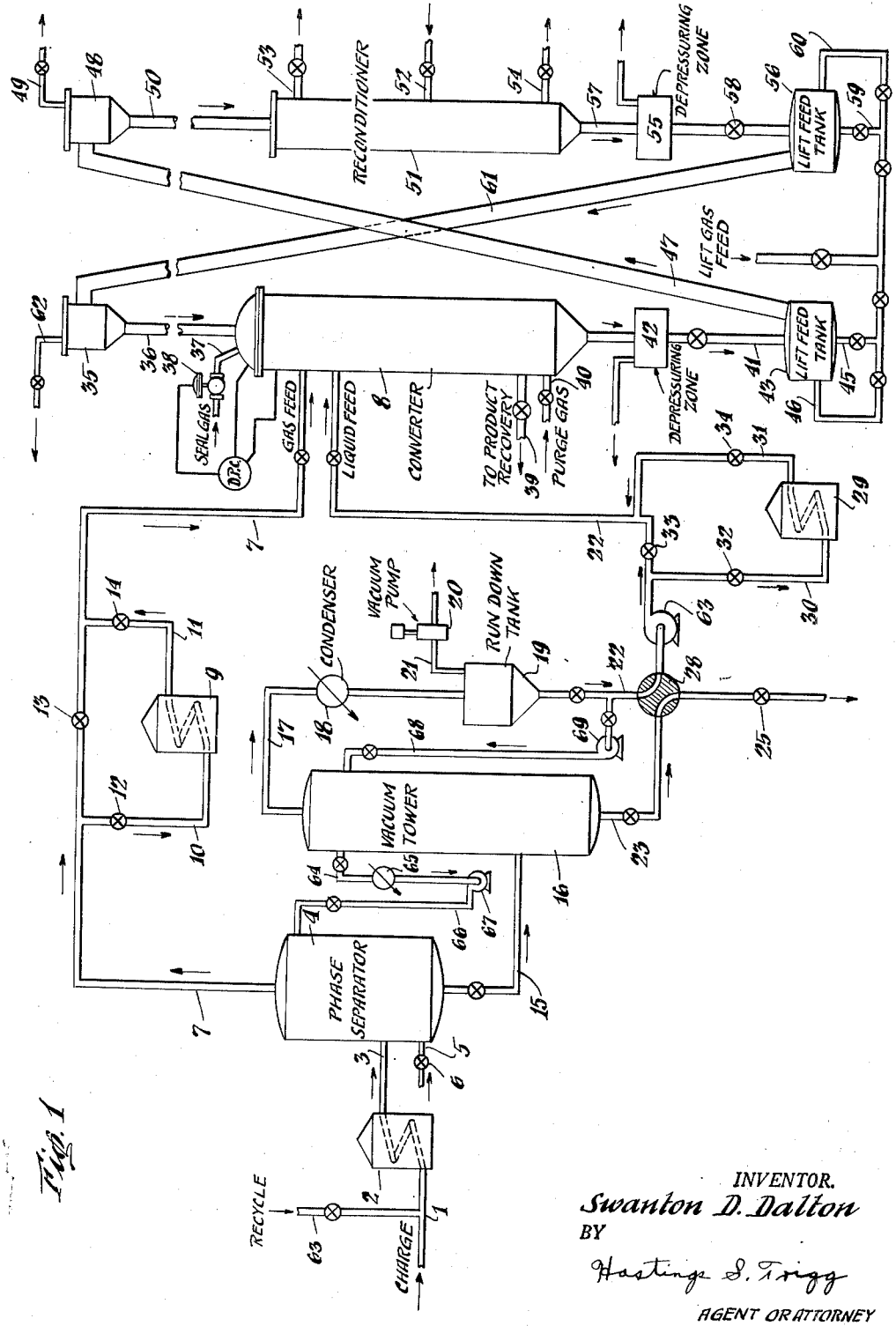
Figure 1 is a diagrammatic representation of the present method embodied in a process of conversion in the presence of a downwardly moving bed of contact material.

Referring now to Fig. 1, a high-boiling liquid hydrocarbon charge stock, such as crude petroleum, is charged by means of a pipe 1 through a furnace 2, or other suitable heating means, wherein the charge stock is heated to a suitable temperature. The temperature used will be sufficient to vaporize a portion of the charge stock but insufficient to cause substantial coking or cracking thereof. Obviously, it will be dependent on the charge stock used.

The heated charge stock passes through pipe 3, into a phase separator 4. In the phase separator 4, the portion of the charge stock which is in the gaseous state at the selected temperature is separated from the remainder of the charge stock. In order to increase the vaporized portion of the stock, if desired, steam may be introduced into the phase separator 4 through pipe 5. The amount of steam introduced can be regulated by means of valve 6. The portion of the charge stock which is in the gaseous phase passes through pipe 7 into a reactor or converter 8, as a gaseous feed. If necessary, the gaseous feed can be heated further by by-passing the entire feed or a portion of it through a furnace 9, or other heating means, via pipes 10 and 11, through suitable manipulation of valves 12, 13, and 14.

The liquid portion of the charge stock from the phase separator 4, still at an elevated temperature, passes through pipe 15, into a vacuum distillation tower 16, which can have two, three, or more plates, wherein it is subjected to suitable vacuum distillation conditions. If it is needed, to maintain the temperature of the liquid portion, heat can be added thereto as it passes through pipe 15. The portion of the material charged via pipe 15 which vaporizes under these conditions is conducted via pipe 17, in the gaseous state, through a suitable condenser device 18. In some cases, an additional cooler may be desirable. The condensed gases, now in the liquid state, then pass into a run down tank 19. The system including the vacuum tower 16, pipe 17, the condenser 18, and the run down tank 19 is maintained under reduced pressure conditions by means of a vacuum pump 20, or other suitable means, e. g., barometric condensing system, connected with the run down tank 19 via pipe 21. The condensed gases, i. e., the vacuum distillate from the vacuum tower 16, pass from the run down tank 19 via pipe 22, through a pump 63, into the converter 8, as the liquid feed. The run down tank 19 is not a necessary element. If desired, an accumulator can be employed. Then, the liquid feed would be pumped directly therefrom. In general, any means, well-known in the art to condense vacuum distillates and to collect the liquid distillate, can be used.

The vacuum distillation is carried out at conditions of temperature and pressure such that a residual material having a soft point of between about 60° F. and about 90° F., by the ASTM test D36–26, is obtained. In preferred operations, a residual material having a soft point of between about 80° F. and about 90° F. is attained. Dependent upon the particular crude charge operated on, these results are obtained by operating within the ranges of temperature and pressure described hereinafter. As will be apparent to those skilled in the art, the residual material or pitch, thus achieved, is much heavier than the heavy fuel oil fractions ordinarily achieved, thus permitting greater utilization of the charge stock. The residual materials, including tars, asphalt, salts, and the like, are removed from the bottom of the vacuum tower 16 via pipe 23. These residual materials can be removed to storage. If it is desired to utilize the residuals as fuel oils, they can be cut back with suitable cracked fuel oil fractions derived from the conversion operations. Suitably, the residuals can be cut back to a viscosity falling within the range of No. 6 fuel oil as specified in ASTM D396–48T, namely, 45–300 seconds Saybolt Furol viscosity at 122° F. The cracked cycle stocks have a considerably better viscosity cutting stock value than straight-run fuel oils of the same boiling range. As a result, a lower volume of cutting stock is required to meet given viscosity specifications than when straight-run cutting stocks are used. This differential in cutting stock can be used as additional cracking stock.

In order to attain maximum utilization of heat, the vacuum distillate is heat-exchanged in a suitable heat exchanger 28, with the hot residual materials flowing through pipe 23. If desired, additional heating of this vacuum distillate can be effected by by-passing all or a portion of it through a heating furnace 29 via pipes 30 and 31, suitably manipulating valves 32, 33, and 34.

In order to improve the overall efficiency of separation within the phase separator 4 and the vacuum tower 16, it will be found advantageous, in some instances, to resort to a recycling or reflux of fractions. Accordingly, a portion of the distillate from the vacuum tower 16 can be removed via pipe 64 and condensed in a suitable condensing or heat exchange means 65. The condensed distillate portion can then be recycled through pipe 66, by means of a pump 67, into the phase separator 4. Likewise, a portion of the condensed vacuum distillate in pipe 22 can be recycled to the vacuum tower 16 by pumping it through pipe 68 by means of pump 69. In this manner, refluxing is achieved in the distillation operation.

In the conversion system shown in Fig. 1, heated contact material, at conversion-supporting temperatures, is supplied from a hopper 35 via gravity feed leg 36 into the top of the converter 8. The converter is partially filled with a compact, downwardly moving bed of contact material to which the gaseous feed and the liquid feed are charged via pipes 7 and 22, respectively. Hydrocarbons are prevented from escaping from the converter 8, by means of an inert gas, suitably flue gas or steam, supplied via pipe 37. The flow of seal gas through pipe 37 is regulated by a diaphragm valve 38 so controlled by means of a differential pressure controller as to maintain an inert gas pressure adjacent to the lower end of contact material feed leg 36 which is higher than the gaseous pressure in the hydrocarbon conversion zone. Converted hydrocarbons, which may contain high percentages of aviation and motor gasolines, and cycle fuel oils, are removed, in the gaseous phase, from the converter 8 through pipe 39. These hydrocarbons are then passed to suitable product recovery operations. In the product recovery system, material boiling above gasoline may be recovered as recycle oil by fractionation. The cycle oil may boil above 400° F., for example. Part of the cycle oil may be employed for cutting back the bottom product from vacuum tower 16. The remainder may be recycled to the reactor as additional charging stock. For example, the recycle oil may enter at pipe 63 before the heater 2. In order to facilitate the removal of the hydrocarbon products and to facilitate their separation from the contact material, an inert purge gas, such as steam or flue gas, may be introduced into the converter 8 via pipe 40.

Used contact material flows downwardly from the converter 8 via conduit 41 through a depressuring zone 42 into a lift feed tank 43. The rate of contact material withdrawal, which will depend on the particular type of conversion operation used, is controlled by valve 44. An inert lift gas, suitably steam or flue gas, is introduced into the lift feed tank 43 via pipes 45 and 46, so as to lift the contact material from the lift feed tank, in gaseous suspension, through a conduit 47 into a hopper 48. The lift gas is separated from the contact material in the hopper 48 and exhausted via pipe 49. Then, the contact material passes downwardly through a gravity feed leg 50 into a reconditioner 51. In processes such as catalytic cracking conversion of hydrocarbons there usually is a considerable lay-down of coke deposits on the contact material. In such a case, the reconditioner 51 takes the form of a regenerator, wherein oxygen or air is introduced via pipe 52 to burn off the coke deposits. The combustion gases are removed through pipes 53 and 54. In other processes, coking of the contact material will not be encountered. In such an event, the reconditioner 51 will take the form of a heater, the heating being accomplished by means of heated gases circulated in through pipe 52 and out through pipes 53 and 54.

Reconditioned and/or heated contact material falls from the bottom of the reconditioner 51 through a depressuring zone 55 into a lift feed tank 56 via conduit 57; the rate of flow being controlled by valve 58. Suitable inert lift gases are introduced through pipes 59 and 60 into the lift feed tank 56, thereby lifting the reconditioned contact material, in gaseous suspension, through conduit 61, into the hopper 35. The contact material is disengaged from the lift gas therein, which gas is exhausted via pipe 62. The contact material then falls downwardly into the gravity feed leg 36 and repeats the aforedescribed cycle.

It must be strictly understood that the invention is not limited to the precise conversion system as illustrated in Fig. 1. Other modifications of this system, well known to the art, are contemplated. For example, the contact material can be lifted through conduits 47 and 61 by other conveyor means, which are adapted to carry hot solid particles.

Figure 2:
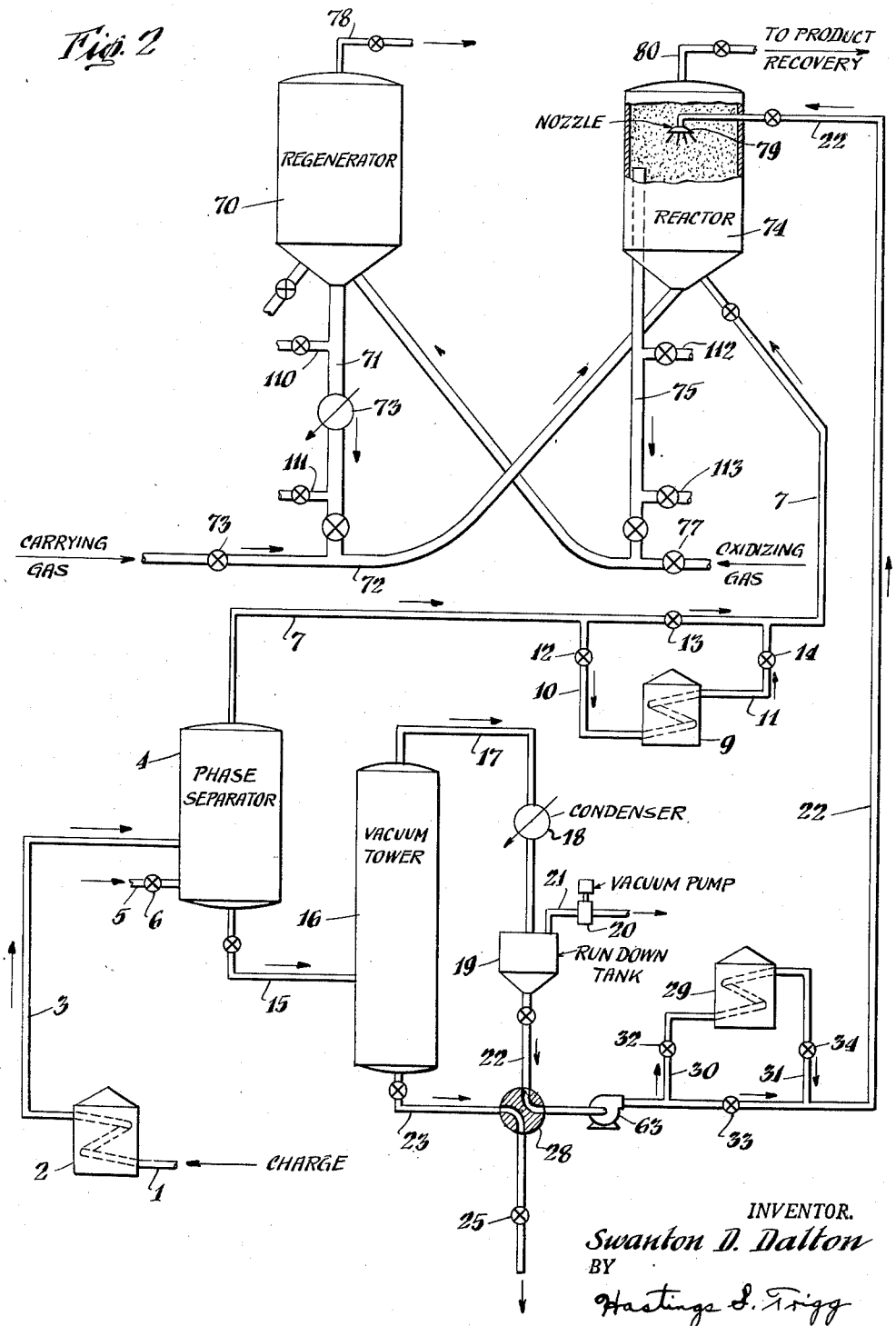
Fig. 2 is a diagrammatic representation of the present method embodied in a process of conversion in the presence of a fluidized mass of contact material.
Figure 3:
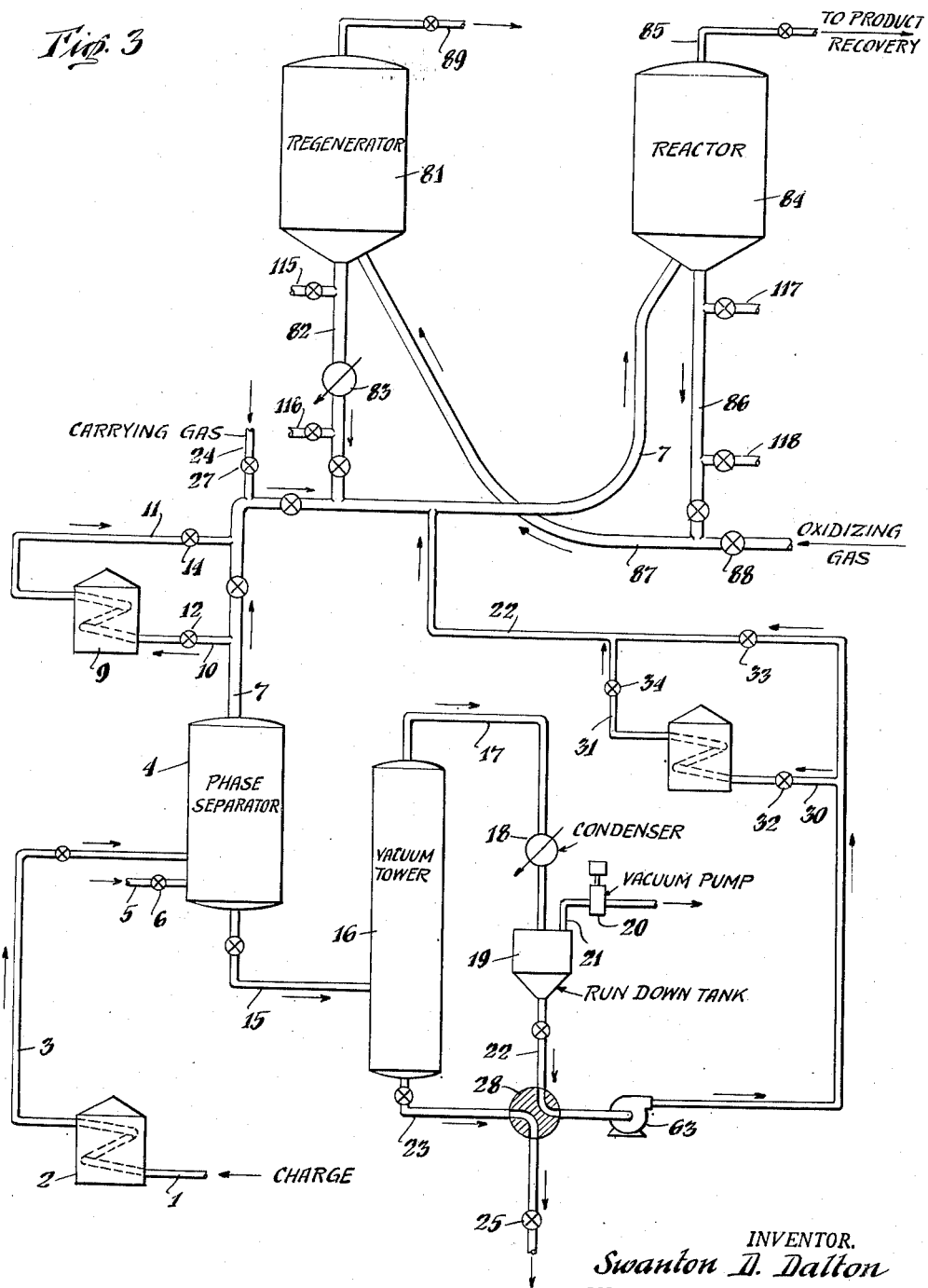
Fig. 3 is a diagrammatic representation of the present method in another embodiment of a process of conversion in the presence of a fluidized mass of contact material.

As stated hereinbefore, other embodiments of the present invention, as applied to conversion in the presence of a fluidized mass of contact material, are set forth in Figs. 2, 3, and 4. Since the method of preparing the gaseous feed and the liquid feed is essentially the same in each embodiment, the same reference numbers which were used in Fig. 1 have been carried over into Figs. 2, 3, and 4, insofar as possible. Reference should be made to the discussion of Fig. 1, up to the point where the gaseous feed and the liquid feed are passed through pipes 7 and 22, respectively, for a description of the steps involved in the embodiments in Figs. 2, 3, and 4.

In the fluid process shown in Fig. 2, finely-divided, solid, contact material passes from the regenerator 70 down a standpipe 71 into a lift conduit 72. The contact material is preferably ground to a fine powder having a particle size of between about 100 and about 400 standard mesh, or even finer. It is maintained in a fluidized state in the standpipe 71 by means of a suitable fluidizing gas introduced via pipes 110 and 111. In passing down the standpipe 71, the contact material is brought to the desired contact temperature by means of a suitable heat exchanger 73 located along the standpipe 71. A carrying gas, such as, for example, steam, flue gas, gaseous hydrocarbons, etc., is introduced into the conduit 72 via valve 73 to lift the contact material, in a fluidized state, up the conduit 72 into the bottom of a reactor 74. The contact material passes upwardly through the reactor 74 as a fluidized bed or mass and overflows into a standpipe 75 and passes down standpipe 75 into a conduit 76. It is maintained in a fluid state by means of a fluidizing gas introduced via pipes 112 and 113. An oxidizing gas is introduced into the conduit 76 via valve 77, whereupon the contact material therein is lifted, in a fluidized state, into the regenerator 70. Combustion products from the regenerator are exhausted via pipe 78.

Gaseous feed material from the phase separator 4 is fed into the lower portion of the reactor 74 via the pipe 7. The vacuum distillate, in the liquid state, is passed via the pipe 22 and sprayed through a suitable nozzle 79, into the upper region of the reactor 74. The carrying gas and the converted hydrocarbon products are passed into an appropriate product recovery operation via pipe 80.

As shown in the fluid process in Figure 3, finely-divided contact material, fluidized by means of suitable gases introduced via conduits 115 and 116, is fed downwardly from the regenerator 81 via standpipe 82 into the pipe or conduit 7. Suitable heat control of the contact material is effected with the heat exchanger 83 located on the standpipe 82. The contact material is lifted up the pipe 7 into the lower region of a reactor 84, fluidized in the gaseous hydrocarbon feed material obtained from the phase separator 4. Additional carrying gas can be introduced via pipe 24, the flow thereof being controlled by valve 27. At a point along the pipe 7, between the point of entry of the contact material from the feed leg 82 and the reactor 84, the vacuum distillate, i. e., the liquid charge material, is introduced via pipe 22. This liquid charge material is partially or entirely vaporized by the hot contact material and carried along with the fluidized contact material into the reactor 84 via conduit 7. The reaction products become disengaged from the contact material in the reactor 84 and pass into a suitable product recovery system via pipe 85. The contact material overflows through a standpipe 86, fluidized by gases introduced via conduits 117 and 118, into a transfer conduit 87. Oxidizing gas is introduced into the conduit 87 through valve 88, whereby the contact material is lifted, in a fluidized state, to the regenerator 81. The gases resulting from the regeneration operation are disengaged from the contact material and they are exhausted via pipe 89.

Referring now to the fluid process embodiment shown in Fig. 4, finely-divided contact material is fed from the regenerator 90 via a standpipe 91, fluidized by gases introduced via pipes 119 and 120, through a heat exchanger 92 into the conduit 22. This conduit contains the vacuum distillate charge feed material, in liquid form, obtained from the vacuum distillation operation in the vacuum tower 16. A carrying gas is introduced into the pipe 22 via pipe 93, at a point just prior to the point where contact material is introduced via the standpipe 91. The contact material is carried upwards, fluidized in the carrying gas and finely-divided liquid feed stock, into the bottom of the reactor 94. The gaseous feed stock, obtained from the phase separator 4, is charged into the lower region of the reactor 94 via the pipe 7. Near the top of the reactor 94, the converted hydrocarbon products and the carrying gas are disengaged from the contact material. The contact material, fluidized by gases introduced through pipes 121 and 122, overflows through a standpipe 99 into a transfer conduit 100. An oxidizing gas is introduced into the conduit to carry the contact material, in a fluidized state, into the bottom of the regenerator 90. The contact material is regenerated as it passes, in a fluidized mass, upwardly through the regenerator. Near the top thereof, the contact material is disengaged from the combustion gases and it overflows into the standpipe 91. The combustion gases are exhausted via pipe 101.

The converted hydrocarbons and the carrying gas are passed into a flash tower 95 via pipe 96. The distillate from the flash tower 95 is passed on to further product recovery operations via pipe 97. The liquid bottoms from the flash tower may be cycled through suitable product recovery operations. However, as shown in Fig. 4, it may be desirable to recycle them via pipe 98 into the liquid feed conduit 22, thereby causing them to be subjected to further conversion in the reactor 94.

It will be noted that an alternative method of heat exchanging the liquid feed material in line 22 is shown in Fig. 4. Instead of heat exchanging the hot heavy residual material in pipe 23 with the liquid feed in pipe 22 in heat exchanger 28, as shown in Figs. 1, 2, and 3, suitable heating can be effected by heat exchanging the hot vacuum distillate vapors in pipe 17 with the liquid feed in pipe 22, in heat exchanger 26. If desired, further heating or adjustment of the temperature of the liquid feed can be had by other suitable means, such as, for example, via heat exchanger 102 on pipe 22 (Fig. 4), or by means of a separate by-pass leading to a furnace 29, as shown in Figs. 1, 2, and 3. The choice of suitable heat exchange systems within the systems within the scope of those illustrated will be a matter of discretion for those skilled in the art.

As will be apparent to those skilled in the art, other modifications and improvements common to the fluid processes can be used. Many of these are not illustrated, in the interest of clarity. Thus, for example, centrifuges or cyclone separators can be installed in the effluent lines from the regenerator and the reactor, in order to ensure complete separation of the fine contact material from the effluent gases.

As mentioned hereinbefore, the operating conditions selected for a conversion operation will depend upon the requirements of the process involved. Likewise, the operating conditions involved in the preparation of the feed materials will vary over a considerable range. In general, a high-boiling liquid charge stock, such as crude petroleum, topped crude petroleum, or other hydrocarbon fractions containing heavy residual materials, will be preheated in furnace 2 to temperatures of between about 700° F. and about 900° F., preferably between about 750° F. and about 850° F. and charged to the phase separator 4 at those temperatures. The charge stock must not be heated to such high temperatures that substantial cracking or coking will occur. The pressures in the phase separator 4 may vary from about 10 to about 30 pounds per square inch gauge, and are preferably sufficiently above the reactor pressure to permit its passage to the reactor by virtue of the pressure differential, and without intermediate condensation and pumping. The vapor feed from the phase separator 4 will be at temperatures of about 600–850° F. It can be charged to the reactor or converter at those temperatures, or further heating may be required, dependent on the type of conversion process used and on the type of feed. The liquid portion of the charge stock from the phase separator 4 is charged into the vacuum tower 16 at temperatures of between about 600° F. and about 850° F. The vacuum tower 16 is operated under pressures of between about one and about six pounds per square inch, absolute, and preferably under about two pounds per square inch, absolute. The vacuum distillate vapors emerge from the vacuum tower at temperatures of between about 550° F. and about 775° F. They are condensed and then reheated and charged into the reactor, in the liquid phase, at temperatures of between about 700° F. and about 800° F. The residual material emerges from the vacuum tower 16 at temperatures of between about 600° F. and about 800° F. It must be strictly understood that the aforedescribed conditions are merely those generally used. Other conditions of temperature and pressure can be used, when the nature of the materials process require it, or admit of it.

The present invention, hereinbefore described, provides an improved method for separating heavy residual materials from charge stocks containing them. It also provides liquid and gaseous feed stocks for conversion purposes. As will be apparent to those skilled in the art, the relative amounts of residual materials, liquid feed stocks, and gaseous feed stocks with respect to the amount of the initial charge stock will vary with the type of initial charge stock and with the operating conditions selected for the feed preparation.

In a typical operation, a Midcontinent crude petroleum stock was fed to a phase separator at about 850° F., with the pressure therein at about 22 pounds per square inch gauge, and with steam being added to facilitate vaporization. Under such conditions about 73 percent of the crude petroleum stock was obtained as the gaseous feed stock, at a temperature of about 760° F. When the remaining 27 percent was charged into a vacuum tower operated at about 790° F. under a vacuum of about 1.9 pounds per square inch absolute, about 49.5 percent (13.4 percent of the crude charged) of liquid feed stock was obtained as the vacuum distillate. The remaining 50.5 percent (13.6 percent of the crude charge) was obtained as heavy residual materials. The vacuum distillate thus obtained had a flash point of 360° F., an A. P. I. gravity of 24.1 and a distillation range as follows:

|  | °F. corrected |
|---|---|
| I. B. P. | 555 |
| 5% | 620 |
| 10% | 648 |
| 20% | 680 |
| 30% | 720 |
| 40% | 760 |
| 50% | 790 |
| 60% | 815 |
| 70% | 848 |
| 80% | 873 |
| 90% | 920 |
| F. B. P. | 980 |

The heavy residual pitch had a soft point (ASTM method D36–26) of 86° F., a flash point of 620° F., and a distillation of:

|  | °F. corrected |
|---|---|
| I. B. P. | 870 |
| 5% | 910 |
| 10% | 925 |
| 20% | 956 |
| 25% | 960[1] |

[1] Cracking commenced.

The relative amounts of feed stock obtained can be varied somewhat by using different operating conditions. For example, if the vacuum tower is operated at about 775° F., under about one pound per square inch absolute, the amount of vacuum distillate can be increased to about 15.8 percent of the crude charged. In this case, the amount of residual pitch will be about 11.4 percent of the crude charged.

In order to cut the residual pitch back to a No. 6 fuel oil having a viscosity of about 125 seconds Saybolt Furol viscosity at 122° F., sufficient cycle stock must be added thereto so that the total volume of No. 6 fuel oil obtained is about 16–17 percent of the crude charged. In other words, the difference between 16–17 percent of the amount of crude charged and the amount of residual pitch attained will be the amount of cycle stock required to cut back to a No. 6 fuel oil of 125 seconds Saybolt Furol viscosity. Of course, more or less cutback stock will be required, dependent on the final viscosity desired within the range of No. 6 fuel oil as specified hereinbefore. Thus, in the main example given, about 2.4–3.4 percent based on crude charged of cycle stock will be required to be added to the 13.6 percent of residual pitch, to achieve a No. 6 fuel oil of 125 seconds Saybolt Furol viscosity at 122° F. In comparison, the amount of No. 6 fuel oil of the same viscosity obtained as the residual in a tar separator operation is about 27 percent of the original charge. Accordingly, it will be apparent that by the present process more than 10 percent more of the crude stock is made available as useful light products and the like.

As used in the claims with reference to the initial charge stock, the term "suitable temperature," refers to a temperature or range of temperatures at which the charge stock will be partially vaporized without undergoing cracking or coking. This varies with the charge stock used. The term, "suitable vacuum distillation conditions," is intended to mean conditions of temperature and pressure under which a desired portion of liquid feed material can be separated in an efficient manner. "Suitable conversion temperatures" mean temperature or a range of temperatures which is suitable for conducting the particular conversion reaction involved at a practical rate and to practical yields of the desired reaction products.

Although the present invention has been described in conjunction with preferred embodiments, it is to be understood that modifications and variations may be resorted to without departing from the spirit and scope of this invention, as those skilled in the art will readily understand. Such variations and modifications are considered to be within the purview and scope of the appended claims.

What is claimed is:

1. A conversion process which comprises heating a high-boiling liquid hydrocarbon charge stock to temperatures of between about 700° F. and about 900° F.; separating therefrom a portion of said charge stock which is in the gaseous phase at temperatures of between about 700° F. and about 900° F.; passing said gaseous phase portion, without intervening cooling and at temperatures of between about 700° F. and about 900° F., into a catalytic conversion zone; subjecting said liquid portion without intervening cooling to vacuum distillation, at temperatures of between about 700° F. and about 900° F., under a vacuum of between about one and about six pounds per square inch absolute; condensing the distillate from said vacuum distillation; passing the condensed vacuum distillate as a liquid, at temperatures of between about 500° F. and about 850° F., into said conversion zone; and removing a heavy residual material having an ASTM soft point of between about 60° F. and about 90° F. from said vacuum distillation.

2. The process of claim 1 further limited to the catalytic conversion zone being a zone in which the conversion is effected through the medium of a compact mass of solid granular catalyst.

3. The process of claim 1 further limited to the catalytic conversion zone being a zone in which the conversion is effected through the medium of a fluidized bed of solid catalyst.

References Cited in the file of this patent

UNITED STATES PATENTS

| Number | Name | Date |
|---|---|---|
| 2,385,325 | Bailey | Sept. 25, 1945 |
| 2,385,326 | Bailey | Sept. 25, 1945 |
| 2,416,608 | Brackenbury | Feb. 25, 1947 |
| 2,419,519 | Evans | Apr. 22, 1947 |
| 2,439,372 | Simpson | Apr. 6, 1948 |
| 2,570,607 | Smith | Oct. 9, 1951 |